(12) United States Patent
Sinnott et al.

(10) Patent No.: US 9,505,017 B2
(45) Date of Patent: Nov. 29, 2016

(54) ROTARY PAINT ATOMIZER SYSTEM AND METHOD OF MONITORING A ROTARY PAINT ATOMIZER

(71) Applicant: GM GLOBAL TECHNOLOGY OPERATIONS LLC, Detroit, MI (US)

(72) Inventors: George J. Sinnott, Lake Orion, MI (US); Derek J. Eschenburg, Richmond, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 180 days.

(21) Appl. No.: 14/450,684

(22) Filed: Aug. 4, 2014

(65) Prior Publication Data

US 2016/0030962 A1 Feb. 4, 2016

(51) Int. Cl.
*B05B 5/00* (2006.01)
*B05B 12/08* (2006.01)
*B05B 5/04* (2006.01)
*G01F 15/06* (2006.01)
*B05B 12/00* (2006.01)
*B05B 5/16* (2006.01)
*B05B 13/04* (2006.01)

(52) U.S. Cl.
CPC ............. *B05B 12/08* (2013.01); *B05B 5/0407* (2013.01); *B05B 5/0422* (2013.01); *B05B 12/004* (2013.01); *G01F 15/06* (2013.01); *B05B 5/0415* (2013.01); *B05B 5/0426* (2013.01); *B05B 5/1675* (2013.01); *B05B 13/0452* (2013.01)

(58) Field of Classification Search
CPC . B05B 5/0531; B05B 5/0426; B05B 7/0861; B05B 1/3046; B05B 5/025; B05B 5/03; B05B 12/12

USPC ............................ 239/691, 705, 69, 291, 451
See application file for complete search history.

(56) References Cited

U.S. PATENT DOCUMENTS

2003/0234272 A1* 12/2003 Lamothe ................. B05B 7/144
228/41
2010/0316530 A1* 12/2010 Morgantini ............... A61L 2/22
422/29

OTHER PUBLICATIONS

"Automated Monitoring and Detection for Rotary Applicator Bell Cups"; Research Disclosure database No. 577032; Apr. 16, 2012; Questel Ireland Ltd., Killernan, Kilmaine, County Mayo, Ireland.

* cited by examiner

*Primary Examiner* — Davis Hwu
(74) *Attorney, Agent, or Firm* — Quinn Law Group, PLLC

(57) ABSTRACT

A method of monitoring a rotary paint atomizer includes determining a target rotational speed, a target air flow rate, a target torque, and a target electrostatic current; and measuring an operating rotational speed, an operating air flow rate, an operating torque, and an operating electrostatic current. The method includes detecting at least one of a first condition in which the operating rotational speed differs from the target rotational speed, a second condition in which the operating air flow rate differs from the target air flow rate, a third condition in which the operating torque differs from the target torque, and a fourth condition in which the operating electrostatic current differs from the target electrostatic current. After detecting, the method includes producing an indicator signal indicative of at least one of the first, second, third, and fourth condition. A rotary paint atomizer system is also disclosed.

15 Claims, 3 Drawing Sheets

ROTARY PAINT ATOMIZER SYSTEM AND METHOD OF MONITORING A ROTARY PAINT ATOMIZER

TECHNICAL FIELD

The disclosure relates to a rotary paint atomizer system and to a method of monitoring a rotary paint atomizer.

BACKGROUND

Rotary paint atomizers generally include a rotatable bell cup which atomizes and electrostatically energizes a coating composition such that the coating composition is electrostatically attracted to a workpiece. Therefore, rotary paint atomizers are often useful for coating operations that require a high workpiece throughput and/or high quality surface coatings. For example, automotive manufacturing operations often employ rotary paint atomizers for depositing a coating composition onto one or more portions of a vehicle.

SUMMARY

A method of monitoring a rotary paint atomizer is disclosed. The rotary paint atomizer includes a bell cup rotatable about an axis, having an outer edge spaced apart from the axis, and configured for ejecting a coating composition from the outer edge towards a workpiece. The rotary paint atomizer also includes a shroud surrounding the bell cup and configured for ejecting a shaping air adjacent to the outer edge. The rotary paint atomizer further includes a motor configured for transmitting the coating composition to the bell cup. In addition, the rotary paint atomizer includes an electrostatic cascade configured for electrically energizing the outer edge so that the coating composition is electrostatically attracted to the workpiece. The method includes determining a target rotational speed of the bell cup about the axis, a target air flow rate of the shaping air ejectable from the shroud, a target torque generatable by the motor, and a target electrostatic current generatable by the electrostatic cascade. The method also includes measuring an operating rotational speed of the bell cup about the axis, an operating air flow rate of the shaping air ejected by the shroud, an operating torque generated by the motor, and an operating electrostatic current generated by the electrostatic cascade. The method further includes detecting at least one of a first condition in which the operating rotational speed differs from the target rotational speed, a second condition in which the operating air flow rate differs from the target air flow rate, a third condition in which the operating torque differs from the target torque, and a fourth condition in which the operating electrostatic current differs from the target electrostatic current. After detecting, the method includes producing an indicator signal indicative of at least one of the first condition, the second condition, the third condition, and the fourth condition.

In one embodiment, the rotary paint atomizer includes an air turbine coupled to the bell cup and configured for rotating the bell cup about the axis at an operating rotational speed, a flow meter configured for transmitting the shaping air to the shroud, and a servo amplifier disposed in electrical communication with the motor. The method includes, after determining, collecting a first analog command output value indicative of the operating rotational speed to thereby measure the operating rotational speed. The first analog command output value is generated by a first proportional-integral-derivative controller that is disposed in electrical communication with a first current-to-pressure transducer that is in turn disposed in pneumatic communication with the air turbine. The method also includes collecting a second analog command output value indicative of the operating air flow rate to thereby measure the operating air flow rate. The second analog command output value is generated by the first proportional-integral-derivative controller that is disposed in electrical communication with a second current-to-pressure transducer that is in turn disposed in pneumatic communication with the flow meter. The method also includes collecting a third analog command output value indicative of the operating torque to thereby measure the operating torque. The third analog command output value is generated by the first proportional-integral-derivative controller that is disposed in electrical communication with the servo amplifier. The method further includes collecting a fourth analog command output value indicative of the operating electrostatic current between the electrostatic cascade and the outer edge to thereby measure the operating electrostatic current. The fourth analog command output value is generated by a second proportional-integral-derivative controller that is disposed in electrical communication with the electrostatic cascade. After collecting, the method includes comparing the operating rotational speed and the target rotational speed; the operating air flow rate and the target air flow rate; the operating torque and the target torque; and the operating electrostatic current and the target electrostatic current. Concurrent to comparing, the method includes detecting at least one of a first condition in which the operating rotational speed differs from the target rotational speed, a second condition in which the operating air flow rate differs from the target air flow rate, a third condition in which the operating torque differs from the target torque, and a fourth condition in which the operating electrostatic current differs from the target electrostatic current.

A rotary paint atomizer system includes a rotary paint atomizer, a programmable logic controller disposed in electrical communication with the rotary paint atomizer, and a user interface disposed in electrical communication with the programmable logic controller. The rotary paint atomizer includes a bell cup rotatable about an axis at an operating rotational speed. The bell cup has an outer edge spaced apart from the axis and is configured for ejecting a coating composition from the outer edge towards a workpiece. The rotary paint atomizer also includes a shroud surrounding the bell cup and configured for ejecting a shaping air adjacent to the outer edge at an operating air flow rate. In addition, the rotary paint atomizer includes a motor configured for generating an operating torque to transmit the coating composition to the bell cup, and an electrostatic cascade configured for generating an operating electrostatic current to electrically energize the outer edge so that the coating composition is electrostatically attracted to the workpiece. The programmable logic controller is configured for collecting a first analog command output value indicative of the operating rotational speed, a second analog command output value indicative of the operating air flow rate, a third analog command output value indicative of the operating torque, and a fourth analog command output value indicative of the operating electrostatic current. The programmable logic controller is also configured for calculating a target rotational speed of the bell cup about the axis, a target air flow rate of the shaping air ejectable from the shroud, a target torque generatable by the motor, and a target electrostatic current generatable by the electrostatic cascade. The user interface is configured for displaying the operating rotational speed, the operating air flow rate, the operating torque, the operating electrostatic current, and an indicator signal. The indicator signal is indicative of at least one of a first condition in which the operating rotational speed differs from the target rotational speed, a second condition in which the operating air flow rate differs from the target air flow rate, a third condition in which the operating torque differs from the target torque, and a fourth condition in which the operating electrostatic current differs from the target electrostatic current.

As used herein, the terms "a," "an," "the," "at least one," and "one or more" are interchangeable and indicate that at least one of an item is present. A plurality of such items may be present unless the context clearly indicates otherwise. The terms "comprising," "includes," "including," and "has" are inclusive and therefore specify the presence of stated items, but do not preclude the presence of other items. As used in this disclosure, the term "or" includes any and all combinations of one or more of the listed items.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
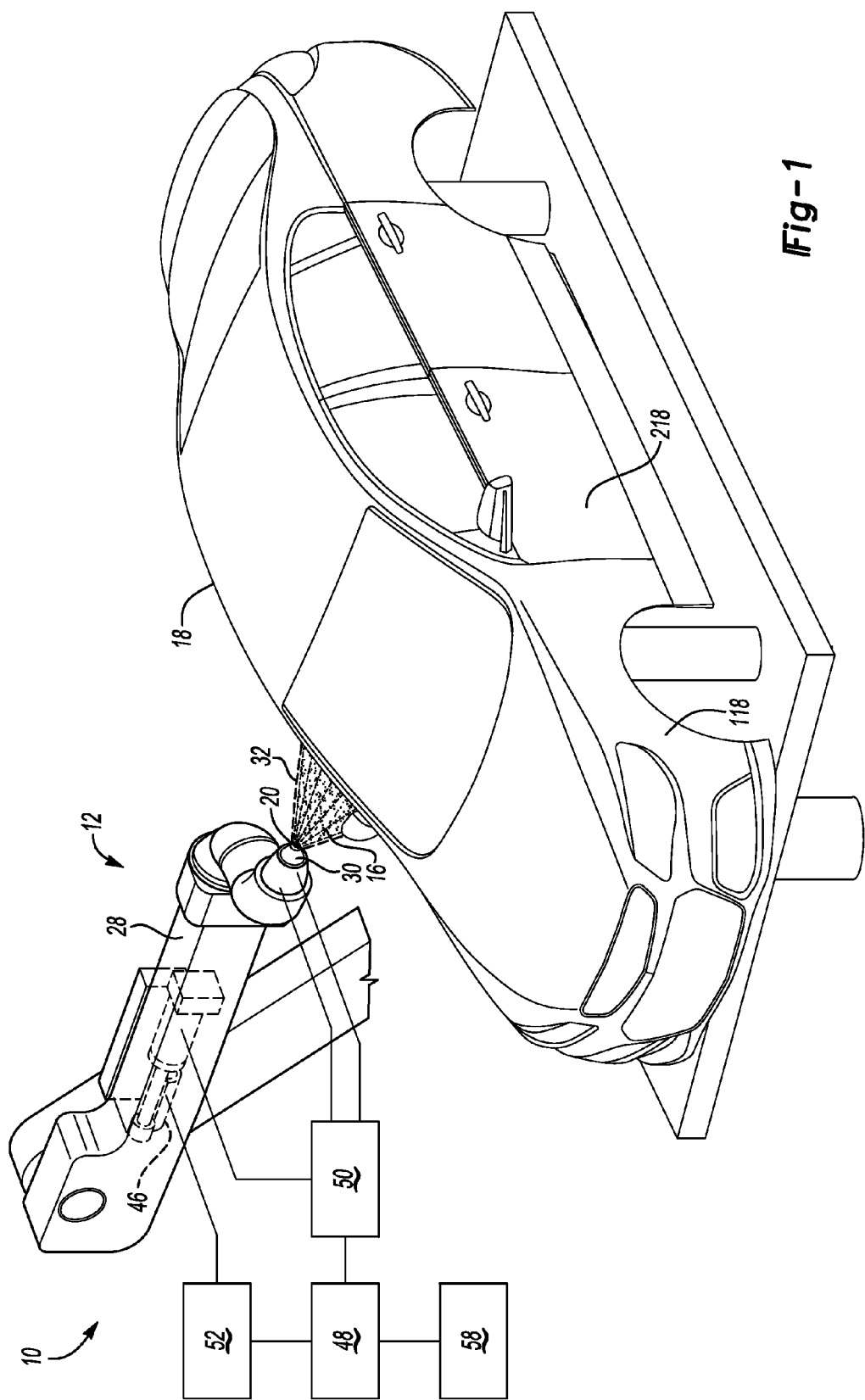
FIG. 1 is a schematic illustration of a perspective view of a rotary paint atomizer system for applying a coating composition to a workpiece, wherein the rotary paint atomizer system includes a rotary paint atomizer having a rotatable bell cup, a shroud, and a motor.
Figure 2:
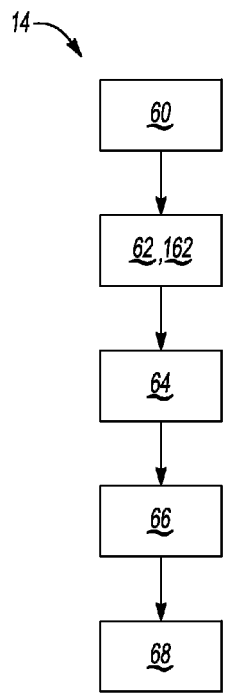
FIG. 2 is a schematic flowchart of a method of monitoring the rotary paint atomizer of FIG. 1.

Referring to the Figures, wherein like reference numerals refer to like elements, a rotary paint atomizer system 10 including a rotary paint atomizer 12 is shown generally in FIG. 1, and a method 14 of monitoring the rotary paint atomizer 12 is shown generally in FIG. 2. The rotary paint atomizer system 10 and method 14 may be useful for automated coating operations, such as automotive manufacturing and assembly operations which include robotic painting of automotive components. In particular, the rotary paint atomizer system 10 and method 14 may effectively monitor an operating status of the rotary paint atomizer 12 during application of a coating composition (shown generally at 16) onto a workpiece 18 and alert a user to potential process deviations, as set forth in more detail below.

Figure 3:
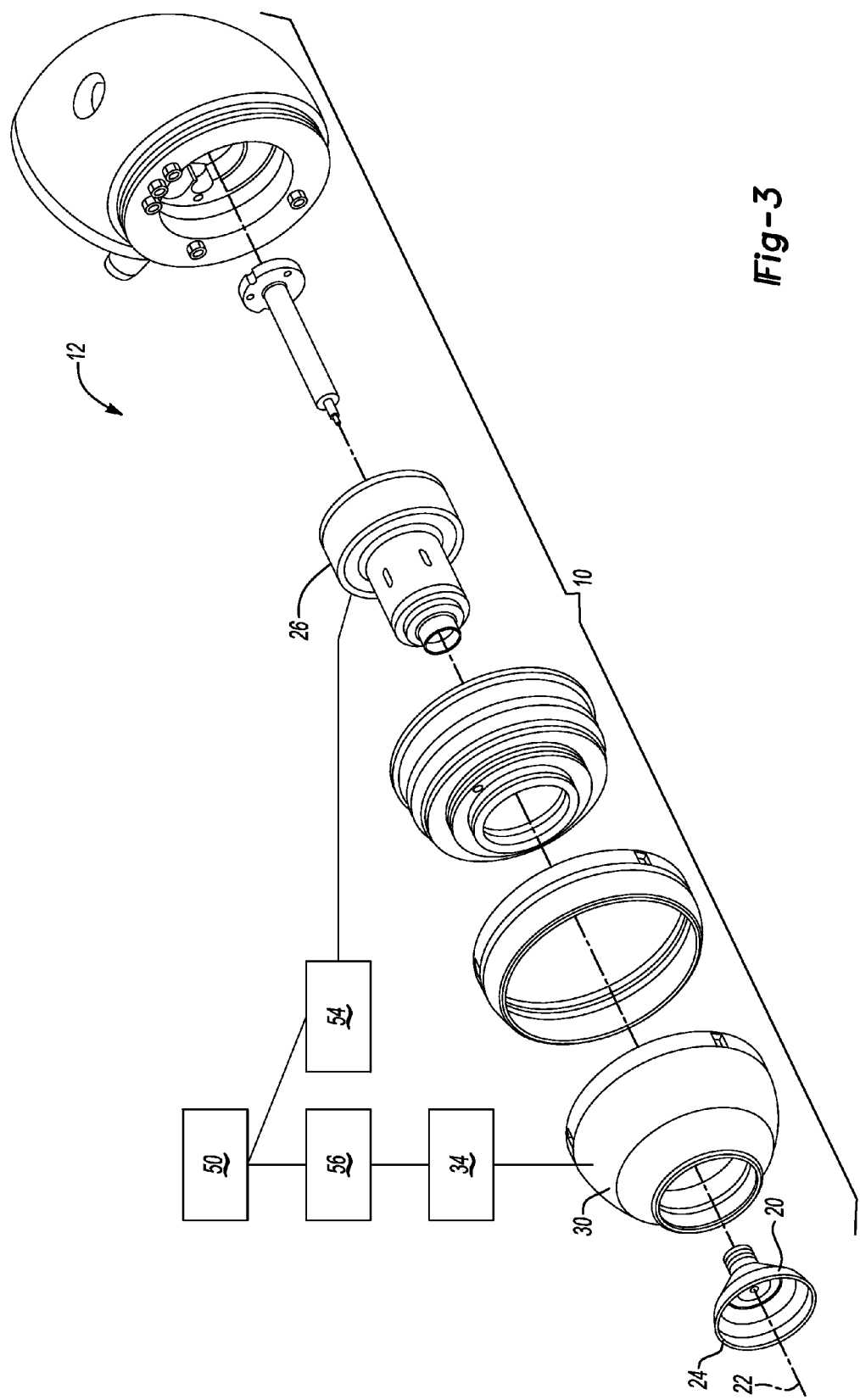
FIG. 3 is a schematic illustration of a perspective, exploded view of the rotatable bell cup and shroud of FIG. 1.

Referring now to FIG. 3, the rotary paint atomizer 12 includes a bell cup 20 rotatable about an axis 22 and having an outer edge 24 spaced apart from the axis 22. The bell cup 20 may have a generally conical or bell shape and is configured for ejecting the coating composition 16 (FIG. 1) from the outer edge 24 towards the workpiece 18 (FIG. 1). During operation of the rotary paint atomizer 12, the bell cup 20 may rotate about the axis 22 at an operating rotational speed of from about 10,000 revolutions per minute (rpm) to about 90,000 rpm. More specifically, the rotary paint atomizer 12 may also include an air turbine 26 coupled to the bell cup 20 and configured for rotating the bell cup 20 about the axis 22. That is, the air turbine 26 may power or drive the bell cup 20 during application of the coating composition 16 to the workpiece 18. The bell cup 20 may be operatively attached to a distal end of a robot arm 28 (FIG. 1) to enable precise positioning of the bell cup 20 with respect to the workpiece 18, and the robot arm 28 may have a robot identifier that differentiates the robot arm 28 from other components or rotary paint atomizers 12.

Referring again to FIG. 1, the coating composition 16 may be a solvent-borne or water-borne coating composition such as, but not limited to, a primer coating composition, a basecoat coating composition, a topcoat coating composition, and a clearcoat coating composition. The coating composition 16 may have a color identifier, such as a numerical value indicative of a color of a cured film (not shown) formed from the coating composition 16. For example, the color identifier may denote a difference in viscosity between various coating compositions 16.

As described with continued reference to FIG. 1, the workpiece 18 may be formed from a metal and/or a plastic, and may be configured as a unibody frame (shown generally at 118) for a vehicle that may include one or more components, such as a door panel (shown generally at 218). Further, the workpiece 18 may have a body style identifier, such as a numerical value indicative of a vehicle type. Alternatively, it is to be appreciated that the workpiece 18 may be a component for a non-automotive application, such as, for example, a building component for a residential or industrial construction application.

Referring again to FIG. 3, the rotary paint atomizer 12 also includes a shroud 30 surrounding the bell cup 20 and configured for ejecting a shaping air (represented generally at 32 in FIG. 1) adjacent to the outer edge 24. That is, a periphery of the shroud 30 may define a plurality of holes therein (not shown), and the shroud 30 may eject the shaping air 32 at an operating air flow rate of from about 50 standard liters per minute, or about 84 Pa·m$^3$/s, to about 1,000 standard liters per minute, or about 1,689 Pa·m$^3$/s. Further, the rotary paint atomizer 12 may also include a flow meter 34 configured for transmitting the shaping air 32 to the shroud 30 from one or more air lines (not shown) of the rotary paint atomizer system 10 so that the shroud 30 ejects the shaping air 32 at the operating air flow rate. The ejected shaping air 32 may therefore form an air envelope about the outer edge 24, and may confine or direct the coating composition 16 (FIG. 1) to the workpiece 18 in a specific pattern or shape as the coating composition 16 is ejected from the outer edge 24. As such, the shroud 30 and shaping air 32 may minimize overspray of the coating composition 16 and associated costs.

Figure 4:
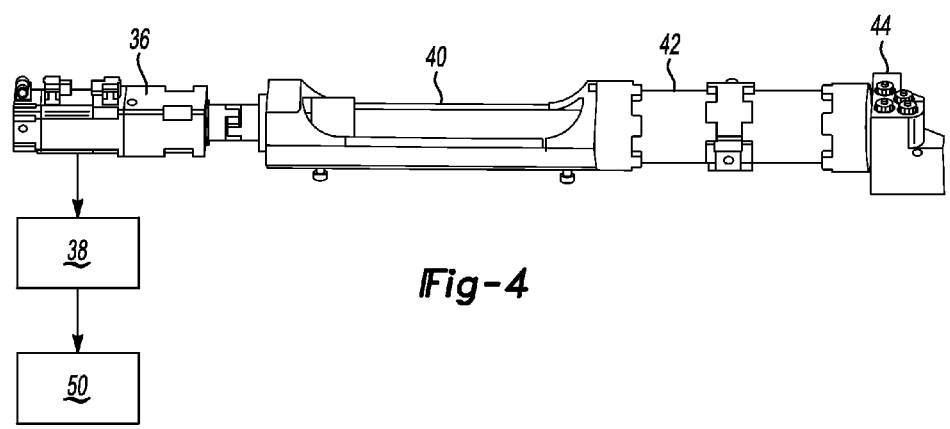
FIG. 4 is a schematic illustration of a perspective view of the motor of FIG. 1.

Referring now to FIG. 4, the rotary paint atomizer 12 also includes a motor 36 configured for transmitting the coating composition 16 (FIG. 1) to the bell cup 20 (FIG. 1), and a servo amplifier 38 that is disposed in electrical communication with the motor 36 such that the motor 36 generates an operating torque. More specifically, the servo amplifier 38 may be configured for commanding the motor 36 to generate the operating torque. As a non-limiting example, the motor 36 may generate the operating torque of from about 5 N·m to about 30 N·m to transmit the coating composition 16 to the bell cup 20.

More specifically, as described with continued reference to FIG. 4, for operations designed to apply a water-borne primer coating composition and/or a water-borne basecoat coating composition to the workpiece 18 (FIG. 1), the rotary paint atomizer 12 may include a canister drive assembly 40 coupled to a canister assembly 42 and configured for feeding a canister manifold assembly 44. The motor 36 may provide power to the canister drive assembly 40 to deliver the coating composition 16 (FIG. 1) through the canister assembly 42 and the canister manifold assembly 44. For example, although not shown, the canister assembly 42 may define a channel therethrough and may include a piston slideably translatable within the channel. The motor 36 may actuate the piston to provide the coating composition 16 to the bell cup 20 (FIG. 1).

Similarly, for operations designed to apply a solvent-borne clearcoat coating composition to the workpiece 18, the motor 36 may provide power to one or more pumps (not shown). For example, although not shown, the rotary paint atomizer 12 may include a first pump configured to deliver a hardener component to a mixing element and a second pump configured to independently deliver a resin component to the mixing element. The hardener component and the resin component may combine within the mixing element to form the solvent-borne clearcoat coating composition. For this application, the motor 36 may provide power to the first and/or second pumps, which may then transmit the coating composition 16 to the bell cup 20 for ejection towards the workpiece 18.

Referring again to FIG. 1, the rotary paint atomizer 12 also includes an electrostatic cascade 46 configured for electrically energizing the outer edge 24 (FIG. 3) of the bell cup 20 so that the coating composition 16 is electrostatically attracted to the workpiece 18. More specifically, the electrostatic cascade 46 may generate an operating electrostatic current of from about 50,000 V to about 90,000 V, e.g., about 80,000 V, between the electrostatic cascade 46 and the outer edge 24 so as to electrically charge the outer edge 24 of the bell cup 20. In particular, as the bell cup 20 rotates about the axis 22 (FIG. 3), the coating composition 16 may atomize and form small droplets (not shown) or spray. As the small droplets contact the outer edge 24 of the bell cup 20, the small droplets may acquire an electric charge. Therefore, the coating composition 16 may have a first electric charge, e.g., a negative electric charge, and the workpiece 18 may have a second electric charge, e.g., a positive electric charge, that is opposite the first electric charge so that the coating composition 16 is electrostatically attracted to the workpiece 18 and binds to a surface of the workpiece 18.

With continued reference to FIG. 1, the rotary paint atomizer system 10 may also include a programmable logic controller 48 disposed in electrical communication with the rotary paint atomizer 12. The programmable logic controller 48 may be embodied as one or more digital computer devices disposed in electrical communication with one or more components of the rotary paint atomizer system 10, and may be configured to withstand a comparatively harsh operating environment which may include moisture, contaminants, and/or high temperature. Structurally, the programmable logic controller may include at least one microprocessor (not shown) disposed in operative communication with tangible, non-transitory memory (not shown), e.g., read-only memory (ROM), flash memory, optical memory, additional magnetic memory, etc. The programmable logic controller 48 may also include any required random access memory (RAM), electrically-programmable read-only memory (EPROM), a high-speed clock, analog-to-digital (A/D) and/or digital-to-analog (D/A) circuitry, and any input/output circuitry or devices, as well as any appropriate signal conditioning and buffer circuitry. Instructions for executing the method 14 (FIG. 2) of monitoring the rotary paint atomizer 12 may be recorded in the memory and executed as needed via the microprocessor. That is, one or more individual control algorithms of the programmable logic controller 48, such as instructions embodying the method 14, may be stored in memory and automatically executed via the microprocessor to provide respective control functionality.

Therefore, the programmable logic controller 48 may include all software, hardware, memory, algorithms, connections, and the like necessary to monitor and control the bell cup 20, the air turbine 26, the shroud 30, the flow meter 34, the motor 36, the servo amplifier 38, and the electrostatic cascade 46. Optionally, one or more sensors (not shown) may be coupled to the bell cup 20, the air turbine 26, the shroud 30, the flow meter 34, the motor 36, the servo amplifier 38, and/or the electrostatic cascade 46, and the one or more sensors may be disposed in operable communication with the programmable logic controller 48. Therefore, the method 14 may be embodied as software or firmware associated with the programmable logic controller 48. It is to be appreciated that the programmable logic controller 48 may also include any device capable of analyzing data from various inputs, e.g., the one or more sensors, comparing data, completing necessary decisions, etc. As set forth in more detail below, a possible control action resulting from execution of the method 14 is an indication of a process deviation for a coating application process.

The programmable logic controller 48 is configured for collecting 162 and/or maintaining a first analog command output value indicative of the operating rotational speed, a second analog command output value indicative of the operating air flow rate, a third analog command output value indicative of the operating torque, and a fourth analog command output value indicative of the operating electrostatic current. The programmable logic controller 48 may maintain, receive, store, update, calculate, write, and/or communicate the first, second, third, and fourth analog command output values, as set forth in more detail below.

Referring again to FIG. 1, the rotary paint atomizer system 10 may further include a first proportional-integral-derivative controller 50 and a second proportional-integral-derivative controller 52 each disposed in electrical communication with the programmable logic controller 48. The first proportional-integral-derivative controller 50 is configured for generating the first analog command output value, the second analog command output value, and the third analog command output value, and as such may be characterized as a motion controller for the robot arm 28 (FIG. 1). The second proportional-integral-derivative controller 52 is configured for generating the fourth analog command output value, and as such may be characterized as an electrostatics system controller.

The first and second proportional-integral-derivative controllers 50, 52 are each disposed in electrical communication with the programmable logic controller 48, and are each configured for calculating an error value or difference between a measured quantity, e.g., the operating rotational speed or the operating electrostatic current, and a desired setpoint quantity, e.g., a target rotational speed or a target electrostatic current. The first and second proportional-integral-derivative controllers 50, 52 may operate to minimize the error value by generating an analog command output value, e.g., the first analog command output value or the fourth analog command output value. The first and second proportional-integral-derivative controllers 50, 52 may each operate according to the same or different algorithms and may include the same or different hardware and/or structure. However, in general, the first and second proportional-integral-derivative controllers 50, 52 may execute algorithms involving three separate constant parameters: a proportional value indicative of a present error or difference between the measured quantity and the desired setpoint quantity, an integral value indicative of an accumulation of past errors between the measured quantity and the desired setpoint quantity, and a derivative value indicative of a prediction of an accumulation of future errors between the measured quantity and the desired setpoint quantity.

Referring now to FIG. 3, the rotary paint atomizer system 10 may further include a first current-to-pressure transducer 54 disposed in pneumatic communication with the air turbine 26 and disposed in electrical communication with the first proportional-integral-derivative controller 50. The first current-to-pressure transducer 54 may be configured for receiving the first analog command output value from the first proportional-integral-derivative controller 50 and commanding the air turbine 26 to rotate the bell cup 20 about the axis 22 at the operating rotational speed. That is, the first current-to-pressure transducer 54 may convert an analog signal, i.e., the first analog command output value, of, for example, from about 4 milliamperes (mA) to about 20 mA, to a proportional linear pneumatic output signal of, for example, about 21 kPa to about 103 kPa. Therefore, the first current-to-pressure transducer 54 may convert the first analog command output value generated by the first proportional-integral-derivative controller 50 to a precise pressure value to thereby control the air turbine 26 and rotate the bell cup 20 at the operating rotational speed. As such, the first analog command output value is indicative of the operating rotational speed of the bell cup 20.

In addition, the air turbine 26 may also be disposed in operative communication with a speed converter (not shown) and may include a speed sensor, e.g., a measurable fiber optic light pulse. The speed converter may also be disposed in electrical communication with the first proportional-integral-derivative controller 50 to define a feedback loop for the operating rotational speed of the air turbine 26 and the bell cup 20. For example, the speed converter may be configured as a pulse-to-analog converter, and may convert the fiber optic light pulse to a first analog value that may be received and processed by the first proportional-integral-derivative controller 50.

Similarly, as described with continued reference to FIG. 3, the rotary paint atomizer system 10 may further include a second current-to-pressure transducer 56 disposed in pneumatic communication with the flow meter 34 and disposed in electrical communication with the first proportional-integral-derivative controller 50. The second current-to-pressure transducer 56 may be configured for receiving the second analog command output value from the first proportional-integral-derivative controller 50 and commanding the flow meter 34 to transmit the shaping air 32 (FIG. 1) to the shroud 30 so that the shroud 30 ejects the shaping air 32 at the operating air flow rate. That is, the second current-to-pressure transducer 56 may convert an analog signal, i.e., the second analog command output value, of, for example, from about 4 mA to about 20 mA, to a proportional linear pneumatic output signal of, for example, about 21 kPa to about 103 kPa. Therefore, the second current-to-pressure transducer 56 may convert the second analog command output value generated by the first proportional-integral-derivative controller 50 to a precise pressure value to control the flow meter 34 and provide the shaping air 32 to the shroud 30. As such, the second analog command output value is indicative of the operating air flow rate of the shaping air 32.

The flow meter 34 may also be disposed in electrical communication with the first proportional-integral-derivative controller 50 to define a feedback loop for the operating air flow rate of the flow meter 34. For example, the flow meter 34 may generate an analog signal of from about 4 mA to about 20 mA that may be received and processed by the first proportional-integral-derivative controller 50.

Likewise, referring again to FIG. 4, the servo amplifier 38 may be disposed in electrical communication with the motor 36 and the first proportional-integral-derivative controller 50. The servo amplifier 38 may be configured for receiving the third analog command output value from the first proportional-integral-derivative controller 50 and commanding the motor 36 to generate the operating torque. That is, the servo amplifier 38 may amplify the third analog command output value and transmit the amplified third analog command output value to the motor 36 so that the motor 36 generates the operating torque in proportion to the third analog command output value. As such, the third analog command output value is indicative of the operating torque.

The motor 36 may also be disposed in electrical communication with the first proportional-integral-derivative controller 50 to define a feedback loop for the operating torque. For example, the motor 36 may generate an analog signal of from about 4 mA to about 20 mA that may be received and processed by the first proportional-integral-derivative controller 50.

Further, referring again to FIG. 1, the second proportional-integral-derivative controller 52 may be disposed in electrical communication with the electrostatic cascade 46. The second proportional-integral-derivative controller 52 may be configured for generating the fourth analog command output value so that the electrostatic cascade 46 generates the operating electrostatic current between the electrostatic cascade 46 and the outer edge 24. That is, the second proportional-integral-derivative controller 52 may generate the fourth analog command output value of from about 4 mA to about 20 mA and command the electrostatic cascade 46 to generate the operating electrostatic current. As such, the fourth analog command output value is indicative of the operating electrostatic current.

The electrostatic cascade 46 may also be disposed in electrical communication with the second proportional-integral-derivative controller 52 to define a feedback loop for the operating electrostatic current. For example, the electrostatic cascade 46 may generate two analog output signals: a voltage or potential analog output signal of from about 4 mA to about 20 mA that is indicative of a voltage produced by the electrostatic cascade 46, and a current analog output signal of from about 4 mA to about 20 mA that is indicative of the operating electrostatic current flowing between the electrostatic cascade 46 and the bell cup 20. Both the voltage or potential analog output signal and the current analog output signal may be received and processed by the second proportional-integral-derivative controller 52.

Referring again to FIG. 1, the rotary paint atomizer system further includes a user interface 58 disposed in electrical communication with the programmable logic controller 48. The user interface 58 may communicate with a user of the rotary paint atomizer system 10 and may be, for example, a graphical user interface. In particular, the user interface 58 is configured for displaying the operating rotational speed, the operating air flow rate, the operating torque, and the operating electrostatic current. For example, the user interface 58 may be characterized as a graphical display or form, may be viewable on a computer monitor or screen, and may be configured for both displaying values, e.g., the operating rotational speed, operating air flow rate, operating torque, and operating electrostatic current, and inputting values, e.g., a first tolerance value, a second tolerance value, a quantity of measurements, and/or a number of instances of an occurrence, as set forth in more detail below.

The user interface 58 is also configured for displaying an indicator signal indicative of at least one of a first condition in which the operating rotational speed differs from the target rotational speed; a second condition in which the operating air flow rate differs from a target air flow rate; a third condition in which the operating torque differs from a target torque; and a fourth condition in which the operating electrostatic current differs from the target electrostatic current. The indicator signal may be a visual signal, an auditory signal, and/or an electrical signal. That is, the indicator signal may be useful for alerting a user to a change in operating conditions, particularly to a change in the operating conditions of one or more components of the rotary paint atomizer 12.

The indicator signal may be an image, shape, and/or color displayed on the user interface 58. For example, the user interface 58 may be subdivided into a plurality of cells which each displays a different value, and the indicator signal may be a change in color of one or more of the plurality of cells. Alternatively or additionally, the indicator signal may be an image, such as a hand, stop sign, or warning triangle, that may only be displayed upon detection of at least one of the first condition, the second condition, the third condition, and the fourth condition. Likewise, the indicator signal may be a change in shape of one or more of the plurality of cells and/or a change in font size or style of the value displayed in one or more of the plurality of cells. Additionally or alternatively, the indicator signal may be auditory, such as a bell or chime. Further, the indicator signal may be an electronic signal conveyed to memory or a computing device upon detection of at least one of the first, second, third, and fourth conditions.

For example, the first condition may occur if the bell cup 20 dislodges from the air turbine 26 or wobbles about the axis 22 due to an obstruction, or if the first current-to-pressure transducer 54 operates abnormally. The first proportional-integral-derivative controller 50 may compensate for the dislodged or improperly-rotating bell cup 20 or malfunctioning first current-to-pressure transducer 54 by instructing the air turbine 26 to provide more or less power to the bell cup 20. That is, under such circumstances, the first proportional-integral-derivative controller 50 may generate a different first analog command output value.

Similarly, the second condition may occur if a shaping air feed line is misrouted, crimped, or disconnected, if the second current-to-pressure transducer 56 operates abnormally, or if one or more of the plurality of holes defined by the shroud 30 is plugged or blocked. The first proportional-integral-derivative controller 50 may compensate for the aforementioned process deviations by instructing the flow meter 34 to provide more or less shaping air to the shroud 30. That is, under such circumstances, the first proportional-integral-derivative controller 50 may generate a different second analog command output value.

Likewise, the third condition may occur if the coating composition 16 builds up on a translating surface (not shown) of the piston (not shown) as the piston translates within the canister assembly 42, if one or more control valves (not shown) of the canister assembly 42 is operating abnormally, or if the motor 36 and/or one or more pumps (not shown) is operating under an increased load. For example, a misdirected quantity of the coating composition 16 may coat the piston, increase a sliding resistance of the piston, and increase the operating torque produced by the motor 36. The first proportional-integral-derivative controller 50 may compensate for the aforementioned process deviations by instructing the servo amplifier 38 to command the motor 36 to generate more or less torque. That is, under such circumstances, the first proportional-integral-derivative controller 50 may generate a different third analog command output value.

In addition, the fourth condition may occur if the electrostatic cascade 46 includes an open or shorted circuit. The second proportional-integral-derivative controller 52 may compensate for the open or shorted circuit by instructing the electrostatic cascade 46 to generate more or less electric current. That is, under such circumstances, the second proportional-integral-derivative controller 52 may generate a different fourth analog command output value.

Referring now to the method 14 (FIG. 2) of monitoring the rotary paint atomizer 12, the method 14 includes determining 60 the target rotational speed of the bell cup 20 rotatable about the axis 22, the target air flow rate of the shaping air 32 ejectable from the shroud 30, the target torque generatable by the motor 36, and the target electrostatic current generatable by the electrostatic cascade 46. For example, determining 60 may include selecting the target rotational speed, the target air flow rate, the target torque, and/or the target electrostatic current from a look-up table or a specification sheet and manually populating the user interface 58.

Alternatively, determining 60 may include electronically calculating the target rotational speed, the target air flow rate, the target torque, and/or the target electrostatic current. For example, in one embodiment, determining 60 may include recording a plurality of operating conditions of a validated standard coating application process in preparation for calculating the target rotational speed, the target air flow rate, the target torque, and/or the target electrostatic current. That is, the method 14 may include recording and storing the operating rotational speed of the bell cup 20 about the axis 22, the operating air flow rate of the shaping air 32 ejected by the shroud 30, the operating torque generated by the motor 36, and the operating electrostatic current generated by the electrostatic cascade 46 over a finite time period or duration for a comparative or standard coating application process in which all components are fully functional and operating optimally. More specifically, the method 14 may include recording and storing a plurality of operating rotational speeds of the bell cup 20 about the axis 22, a plurality of operating air flow rates of the shaping air 32 ejected by the shroud 30, a plurality of operating torques generated by the motor 36, and a plurality of electrostatic currents generated by the electrostatic cascade 46 during the standard coating application process over a finite time period or duration.

To that end, the user interface 58 (FIG. 1) may include a reset toggle or input button (not shown) which allows a user to instruct the rotary paint atomizer system 10 to begin recording, storing, and/or calculating the plurality of operating conditions of the standard coating application process. Such reset functionality may be useful after maintenance and/or color change-out operations in which, for example, the bell cup 20 is inspected and/or cleaned.

Referring again to FIG. 2, the method 14 also includes measuring 62 an operating rotational speed of the bell cup 20 about the axis 22, an operating air flow rate of the shaping air 32 ejected by the shroud 30, the operating torque generated by the motor 36, and an operating electrostatic current generated by the electrostatic cascade 46 for comparison to the target rotational speed, the target air flow rate, the target torque, and the target electrostatic current, respectively. The method 14 may therefore monitor for out-of-tolerance operational variables, and provide information regarding an operational health and/or consistency of the coating application process and rotary paint atomizer 12.

More specifically, the method 14 may readily detect deviations from the standard coating application process that may otherwise go undetected. That is, since the first and second proportional-integral-derivative controllers 50, 52 may be generally configured to minimize the error value between a measured quantity, e.g., the operating rotational speed or the operating electrostatic current, and a desired setpoint quantity, e.g., the target rotational speed or the target electrostatic current, and therefore may attempt to compensate for a process deviation, e.g., a dislodged bell cup 20, the method 14 ensures detection of such process deviations by scanning for trends in the first, second, third, and fourth analog command output values.

In particular, in one embodiment, the method 14 includes collecting 162 the first analog command output value generated by the first proportional-integral-derivative controller 50 to thereby measure the operating rotational speed. Similarly, the method 14 includes collecting 162 the second analog command output value generated by the first proportional-integral-derivative controller 50 to thereby measure the operating air flow rate.

In addition, the method 14 includes collecting 162 the third analog command output value generated by the first proportional-integral-derivative controller 50 to thereby measure the operating torque. Likewise, the method 14 includes collecting 162 the fourth analog command output value generated by the second proportional-integral-derivative controller 52 to thereby measure the operating electrical current.

Since the method 14 includes measuring 62 or collecting 162 the first, second, third, and fourth analog command output values rather than only measuring a single-value upper or lower limit, the method 14 provides comparatively faster response time for detecting deviations from the standard coating application process. For example, under an example condition in which the bell cup 20 malfunctions or becomes dislodged from the shroud 30, the first proportional-integral-derivative controller 50 may compensate by regulating the first analog command output value. Since a properly functioning bell cup 20 generally requires a comparatively higher first analog command output value than a malfunctioning bell cup 20, and since the method 14 includes measuring 62 the first analog output command value, the method 14 provides timely and effective monitoring of the operability of the rotary paint atomizer 12. Collecting 162 or measuring 62 the first, second, third, and fourth analog command output values allows for predictive control of the coating application process rather than reactive response to any process deviations.

In particular, collecting 162 may include concurrently gathering a plurality of first analog command output values, a plurality of second analog command output values, and a plurality of third analog command output values each generated by the first proportional-integral-derivative controller 50; and a plurality of fourth analog command output values each generated by the second proportional-integral-derivative controller 52. That is, the method 14 may include simultaneously collecting 162, recording, and/or storing the plurality of first, second, third, and fourth analog command output values as the coating composition 16 is applied to the workpiece 18.

As such, in one embodiment, measuring 62 or collecting 162 may occur prior to determining 60. That is, the rotary paint atomizer system 10 may be configured to "learn", i.e., measure, record, and/or store, the plurality of first, second, third, and fourth analog command output values for a duration before determining 60 the target rotational speed, target air flow rate, target torque, and target electrostatic current, respectively. Alternatively, in another embodiment, measuring 62 may occur after determining 60. That is, determining 60 may include selecting a predetermined target rotational speed, target air flow rate, target torque, and target electrostatic current from a look-up table, database, or specification sheet prior to measuring 62 or collecting 162 at least one of the first, second, third, and fourth analog command output values.

Alternatively, in other embodiments, measuring 62 may be simultaneous to determining 60. For example, determining 60 may include calculating a rolling average of one or more of the first, second, third, and fourth analog command output values for subsequent or concurrent comparison to the target rotational speed, target air flow rate, target torque, and target electrostatic current, respectively.

For example, referring again to determining 60 the target rotational speed, the method 14 may include, after concurrently gathering, calculating an average value of the plurality of first analog command output values to determine the target rotational speed. Alternatively, determining 60 may include setting a minimum of the plurality of first analog command output values as the target rotational speed. Conversely, determining 60 may include setting a maximum of the plurality of first analog command output values as the target rotational speed.

In addition, the method 14 may include setting a tolerance of the target rotational speed to compensate for variations in manufacturing and maintenance operations. That is, the method 14 may further include, after calculating the average value or setting the minimum or maximum value of the plurality of first analog command output values, modifying the average value, minimum value, or maximum value by a first tolerance value to determine the target rotational speed. For example, the first tolerance value may be equal to from about 1 percent to about 5 percent of the average value, minimum value, or maximum value of the plurality of first analog command output values.

Referring now to determining 60 the target air flow rate, the method 14 may include, after concurrently gathering, calculating a second range of the plurality of second analog command output values to determine the target air flow rate. In particular, the second range may include and span from a minimum of the plurality of second analog command output values to a maximum of the plurality of second analog command output values.

In addition, the method 14 may include setting a tolerance of the target air flow rate to compensate for variations in manufacturing and maintenance operations. That is, the method 14 may further include, after calculating the second range of the plurality of second analog command output values, modifying the second range by a second tolerance value to determine the target air flow rate. For example, the second tolerance value may be equal to from about 1 percent to about 5 percent of the minimum value and/or maximum value of the plurality of second analog command output values.

Referring now to determining 60 the target torque, the method 14 may include, after concurrently gathering, calculating a third range of the plurality of third analog command output values to determine the target torque. In particular, the third range may include and span from a minimum of the plurality of third analog command output values to a maximum of the plurality of third analog command output values.

In addition, the method 14 may include setting a tolerance of the target torque to compensate for variations in manufacturing and maintenance operations. That is, the method 14 may further include, after calculating the third range of the plurality of third analog command output values, modifying the third range by a third tolerance value to determine the target torque. For example, the third tolerance value may be equal to from about 1 percent to about 5 percent of the minimum value and/or maximum value of the plurality of third analog command output values.

Referring now to determining 60 the target electrostatic current, the method 14 may include, after concurrently gathering, calculating a fourth range of the plurality of fourth analog command output values to determine the target electrostatic current. In particular, the fourth range may include and span from a minimum of the plurality of fourth analog command output values to a maximum of the plurality of fourth analog command output values.

In addition, the method 14 may include setting a tolerance of the target torque to compensate for variations in manufacturing and maintenance operations. That is, the method 14 may further include, after calculating the fourth range of the plurality of fourth analog command output values, modifying the fourth range by a fourth tolerance value to determine the target electrostatic current. For example, the fourth tolerance value may be equal to from about 1 percent to about 5 percent of the minimum value and/or maximum value of the plurality of fourth analog command output values.

Referring again to FIG. 2, the method 14 further includes, after determining 60 and measuring 62 or collecting 162, detecting 64 at least one of the first condition in which the operating rotational speed differs from the target rotational speed; the second condition in which the operating air flow differs from the target air flow rate; the third condition in which the operating torque differs from the target torque; and the fourth condition in which the operating electrostatic current differs from the target electrostatic current. Stated differently, the method 14 may include, after measuring 62 or collecting 162, comparing 66 the operating rotational speed and the target rotational speed; the operating air flow rate and the target air flow rate; the operating torque and the target torque; and the operating electrostatic current and the target electrostatic current. Therefore, detecting 64 may be concurrent to comparing 66.

After detecting 64, the method 14 includes producing 68 the indicator signal indicative of at least one of the first condition, the second condition, the third condition, and the fourth condition. That is, the method 14 may alert a user to at least one of the first, second, third, and fourth conditions so that the user may visually or otherwise verify suitable operation of the rotary paint atomizer 12 and/or effective operation of the coating application process.

The method 14 may also include halting the coating application process. For example, under standard operating conditions, the bell cup 20 and/or robot arm 28 may be translatable towards the workpiece 18 as the workpiece 18 travels along a conveyor or assembly line. That is, the method 14 may include, before detecting 64, translating the bell cup 20 towards the workpiece 18 to position the bell cup 20 for effective coating of the workpiece 18. However, the method 14 may further include, concurrent to producing 68, halting translation of the bell cup 20 such that the bell cup 20 is stationary with respect to the workpiece 20. That is, the indicator signal may also be indicative of a command to stop translation of the bell cup 20, robot arm 28, and/or workpiece 18, i.e., to halt the coating application operation.

The method 14 also allows a user to select a threshold at which the indicator signal will be produced. In particular, the method 14 may include specifying a required number of instances of the first, second, third, and/or fourth conditions over a certain quantity of measurements of the first, second, third, and/or fourth analog command output values, respectively, before producing 68 the indicator signal.

More specifically, measuring 62 may include specifying a first quantity of measurements of the operating rotational speed and a first number of instances of the first condition, wherein the first number of instances is less than the first quantity of measurements. For example, a user or the programmable logic controller 48 may input and/or set the first quantity of measurements at eight and the first number of instances at three. Therefore, in this non-limiting example, in order to produce the indicator signal, the method 14 includes detecting 64 three distinct instances of the first condition in which the operating rotational speed differs from the target rotational speed over eight measurements of the operating rotational speed.

Measuring 62 may also include specifying a second quantity of measurements of the operating air flow rate and a second number of instances of the second condition, wherein the second number of instances is less than the second quantity of measurements. For example, a user or the programmable logic controller 48 may input and/or set the second quantity of measurements at nine and the second number of instances at three. Therefore, in this non-limiting example, in order to produce the indicator signal, the method 14 includes detecting 64 three distinct instances of the second condition in which the operating air flow rate differs from the target air flow rate over nine measurements of the operating air flow rate.

In addition, measuring 62 may also include specifying a third quantity of measurements of the operating torque and a third number of instances of the third condition, wherein the third number of instances is less than the third quantity of measurements. For example, a user or the programmable logic controller 48 may input and/or set the third quantity of measurements at six and the third number of instances at three. Therefore, in this non-limiting example, in order to produce the indicator signal, the method 14 includes detecting 64 three distinct instances of the third condition in which the operating torque differs from the target torque over six measurements of the operating torque.

Further, measuring 62 may also include specifying a fourth quantity of measurements of the operating electrostatic current and a fourth number of instances of the fourth condition, wherein the fourth number of instances is less than the fourth quantity of measurements. For example, a user or the programmable logic controller 48 may input and/or set the fourth quantity of measurements at nine and the fourth number of instances at three. Therefore, in this non-limiting example, in order to produce the indicator signal, the method 14 includes detecting 64 three distinct instances of the fourth condition in which the operating electrostatic current differs from the target electrostatic current over nine measurements of the operating electrostatic current.

Therefore, detecting 64 may include considering the quantity of measurements and the number of instances. In particular, detecting 64 may include at least one of compiling the first quantity of measurements of the operating rotational speed, accumulating the first number of instances of the first condition, compiling the second quantity of measurements of the operating air flow rate, accumulating the second number of instances of the second condition, compiling the third quantity of measurements of the operating torque, accumulating the third number of instances of the third condition, compiling the fourth quantity of measurements of the operating electrostatic current, and accumulating the fourth number of instances of the fourth condition.

That is, detecting 64 may further include at least one of accumulating or counting the first number of instances before completely compiling or amassing the first quantity of measurements; accumulating the second number of instances before completely compiling the second quantity of measurements; accumulating the third number of instances before completely compiling the third quantity of measurements; and accumulating the fourth number of instances before completely compiling the fourth quantity of measurements.

As such, the method 14 may include producing 68 the indicator signal upon detection of the first number of instances of the first condition, i.e., in which the operating rotational speed differs from the target rotational speed, before detection of the first quantity of measurements of the operating rotational speed. Stated differently, as a non-limiting example, once three instances of the first condition are detected within eight measurements of the operating rotational speed, i.e., once three instances are detected before eight measurements are detected or compiled, the method 14 includes producing 68 the indicator signal to alert a user to a potential inefficiency or process deviation of the coating application process and/or the rotary paint atomizer 12.

Similarly, the method 14 may include producing 68 the indicator signal upon detection of the second number of instances of the second condition, i.e., in which the operating air flow rate differs from the target air flow rate, before detection of the second quantity of measurements of the operating air flow rate. Stated differently, as a non-limiting example, once three instances of the second condition are detected within nine measurements of the operating air flow rate, i.e., once three instances are detected before nine measurements are detected or compiled, the method 14 includes producing 68 the indicator signal to alert a user to a potential inefficiency or process deviation of the coating application process and/or the rotary paint atomizer 12.

Alternatively or additionally, the method 14 may include producing 68 the indicator signal upon detection of the third number of instances of the third condition, i.e., in which the operating torque differs from the target torque, before detection of the third quantity of measurements of the operating torque. Stated differently, as a non-limiting example, once three instances of the third condition are detected within six measurements of the operating torque, i.e., once three instances are detected before six measurements are detected or compiled, the method 14 includes producing 68 the indicator signal to alert a user to a potential inefficiency or process deviation of the coating application process and/or the rotary paint atomizer 12.

Likewise, the method 14 may include producing 68 the indicator signal upon detection of the fourth number of instances of the fourth condition, i.e., in which the operating electrostatic current differs from the target electrostatic current, before detection of the fourth quantity of measurements of the operating electrostatic current. Stated differently, as a non-limiting example, once three instances of the fourth condition are detected within nine measurements of the operating electrostatic current, i.e., once three instances are detected before nine measurements are detected or compiled, the method 14 includes producing 68 the indicator signal to alert a user to a potential inefficiency or process deviation of the coating application process and/or the rotary paint atomizer 12.

Conversely, in other situations, detecting 64 may include at least one of: compiling the first quantity of measurements before accumulating the first number of instances and, after compiling the first quantity, resetting a count of the first number of instances to zero; compiling or amassing the second quantity of measurements before accumulating the second number of instances and, after compiling the second quantity, resetting a count of the second number of instances to zero; compiling the third quantity of measurements before accumulating the third number of instances, and, after compiling the third quantity, resetting a count of the third number of instances to zero; and compiling the fourth quantity of measurements before accumulating the fourth number of instances and, after compiling the fourth quantity, resetting a count of the fourth number of instances to zero.

By way of a non-limiting examples, detecting 64 may include compiling eight measurements of the operating rotational speed before accumulating or accumulating or counting three instances of the first condition, and therefore resetting the count of the first number of instances to zero. Likewise, detecting 64 may include compiling nine measurements of the operating air flow rate before accumulating three instances of the second condition, and therefore resetting the count of the second number of instances to zero. Similarly, detecting 64 may include compiling six measurements of the operating torque before accumulating three instances of the third condition, and therefore resetting the count of the third number of instances to zero. Additionally, detecting 64 may include compiling nine measurements of the operating electrostatic current before accumulating three instances of the fourth condition, and therefore resetting the count of the fourth number of instances to zero.

In addition, the method 14 may further include, after measuring 62 or collecting 162, categorizing at least one of the operating rotational speed, the operating air flow rate, the operating torque, and the operating electrostatic current by at least one of the robot identifier, the color identifier, and the body style identifier. That is, the method 14 may include storing and sorting the operating rotational speed, the operating air flow rate, the operating torque, and the operating electrostatic current according to categories delineated by the robot identifier, the color identifier, and/or the body style identifier. Further, the method 14 may include storing and sorting the target rotational speed, the target air flow rate, the target torque, and the target electrostatic current according to categories delineated by the robot identifier, the color identifier, and/or the body style identifier.

Therefore, the method 14 and rotary paint atomizer system 10 provide effective monitoring of the operational health or efficiency of a coating application process. As such, the method 14 may minimize scrap and manufacturing costs associated with production downtime. Further, the rotary paint atomizer system 10 allows for user-settable tolerances and deviation counts for key operating parameters or variables, i.e., the operating rotational speed, the operating air flow rate, the operating torque, and the operating electrostatic current. Consequently, the method 14 and rotary paint atomizer system 10 may quickly detect a missing or obstructed bell cup 20, air feed line, electrostatic cable, and/or a non-operational current-to-pressure transducer 54, 56.

Since the method 14 tracks or measures the first, second, third, and fourth analog command output signals as an indication of the operating rotational speed, the operating air flow rate, the operating torque, and the operating electrostatic current, respectively, the method 14 detects potential process deviations comparatively sooner, even while the first and second proportional-integral-derivative controllers 50, 52 correctly compensate for such deviations. In addition, the method 14 may categorize key operating parameters or variables by color identifier, body style identifier, and robot identifier for efficient process tracking and troubleshooting.

While the best modes for carrying out the disclosure have been described in detail, those familiar with the art to which this disclosure relates will recognize various alternative designs and embodiments for practicing the disclosure within the scope of the appended claims.

The invention claimed is:

1. A method of monitoring a rotary paint atomizer, wherein the rotary paint atomizer includes a bell cup rotatable about an axis, having an outer edge spaced apart from the axis, and configured for ejecting a coating composition from the outer edge towards a workpiece; an air turbine coupled to the bell cup and configured for rotating the bell cup about the axis at an operating rotational speed; a shroud surrounding the bell cup and configured for ejecting a shaping air adjacent to the outer edge at an operating air flow rate; a flow meter configured for transmitting the shaping air to the shroud; a motor configured for generating an operating torque and transmitting the coating composition to the bell cup; a servo amplifier disposed in electrical communication with the motor; and an electrostatic cascade configured for generating an operating electrostatic current and electrically energizing the outer edge so that the coating composition is electrostatically attracted to the workpiece, the method comprising:
determining:
a target rotational speed of the bell cup about the axis;
a target air flow rate of the shaping air ejectable from the shroud;
a target torque generatable by the motor; and
a target electrostatic current generatable by the electrostatic cascade;
after determining, collecting:
a first analog command output value indicative of the operating rotational speed and generated by a first proportional-integral-derivative controller that is disposed in electrical communication with a first current-to-pressure transducer that is disposed in pneumatic communication with the air turbine to thereby measure the operating rotational speed;
a second analog command output value indicative of the operating air flow rate and generated by the first proportional-integral-derivative controller that is disposed in electrical communication with a second current-to-pressure transducer that is disposed in pneumatic communication with the flow meter to thereby measure the operating air flow rate;
a third analog command output value indicative of the operating torque and generated by the first proportional-integral-derivative controller that is disposed in electrical communication with the servo amplifier that is disposed in electrical communication with the motor to thereby measure the operating torque; and
a fourth analog command output value indicative of the operating electrostatic current between the electrostatic cascade and the outer edge and generated by a second proportional-integral-derivative controller that is disposed in electrical communication with the electrostatic cascade to thereby measure the operating electrostatic current;
after collecting, comparing:
the operating rotational speed and the target rotational speed;
the operating air flow rate and the target air flow rate;
the operating torque and the target torque; and
the operating electrostatic current and the target electrostatic current;
concurrent to comparing, detecting at least one of:
a first condition in which the operating rotational speed differs from the target rotational speed;
a second condition in which the operating air flow rate differs from the target air flow rate;
a third condition in which the operating torque differs from the target torque; and
a fourth condition in which the operating electrostatic current differs from the target electrostatic current; and
after detecting, producing an indicator signal indicative of at least one of the first condition, the second condition, the third condition, and the fourth condition.

2. The method of claim 1, further including, before detecting, translating the bell cup towards the workpiece, and concurrent to producing, halting translation of the bell cup with respect to the workpiece.

3. The method of claim 1, wherein collecting includes concurrently gathering:
a plurality of first analog command output values, a plurality of second analog command output values, and a plurality of third analog command output values each generated by the first proportional-integral-derivative controller; and
a plurality of fourth analog command output values each generated by the second proportional-integral-derivative controller.

4. The method of claim 3, further including, after concurrently gathering, calculating an average value of the plurality of first analog command output values to determine the target rotational speed.

5. The method of claim 4, further including, after calculating, modifying the average value by a first tolerance value to determine the target rotational speed.

6. The method of claim 3, further including, after concurrently gathering, calculating a second range of the plurality of second analog command output values to determine the target air flow rate, wherein the second range includes and spans from a minimum of the plurality of second analog command output values to a maximum of the plurality of second analog command output values.

7. The method of claim 6, further including, after calculating, modifying the second range by a second tolerance value to determine the target air flow rate.

8. The method of claim 3, further including, after concurrently gathering, calculating a third range of the plurality of third analog command output values to determine the target torque, wherein the third range includes and spans from a minimum of the plurality of third analog command output values to a maximum of the plurality of third analog command output values.

9. The method of claim 8, further including, after calculating, modifying the third range by a third tolerance value to determine the target torque.

10. The method of claim 3, further including, after concurrently gathering, calculating a fourth range of the plurality of fourth analog command output values to determine the target electrostatic current, wherein the fourth range includes and spans from a minimum of the plurality of fourth analog command output values to a maximum of the plurality of fourth analog command output values.

11. The method of claim 10, further including, after calculating, modifying the fourth range by a fourth tolerance value to determine the target electrostatic current.

12. The method of claim 1, wherein the coating composition has a color identifier; the workpiece has a body style identifier; and the rotary paint atomizer is operatively attached to a robot arm having a robot identifier; and
further including, after collecting, categorizing at least one of the operating rotational speed, the operating air flow rate, the operating torque, and the operating electrostatic current by at least one of the robot identifier, the color identifier, and the body style identifier.

13. The method of claim 12, wherein detecting further includes at least one of: accumulating a first number of instances of the first condition, accumulating a second number of instances of the second condition, accumulating a third number of instances of the third condition, and accumulating a fourth number of instances of the fourth condition.

14. A rotary paint atomizer system comprising:
a rotary paint atomizer including:
    a bell cup rotatable about an axis at an operating rotational speed, having an outer edge spaced apart from the axis, and configured for ejecting a coating composition from the outer edge towards a workpiece;
    a shroud surrounding the bell cup and configured for ejecting a shaping air adjacent at the outer edge at an operating air flow rate;
    a motor configured for generating an operating torque to transmit the coating composition to the bell cup; and
    an electrostatic cascade configured for generating an operating electrostatic current to electrically energize the outer edge so that the coating composition is electrostatically attracted to the workpiece;
a programmable logic controller disposed in electrical communication with the rotary paint atomizer and configured for:
    collecting a first analog command output value indicative of the operating rotational speed, a second analog command output value indicative of the operating air flow rate, a third analog command output value indicative of the operating torque, and a fourth analog command output value indicative of the operating electrostatic current; and
    calculating a target rotational speed of the bell cup about the axis, a target air flow rate of the shaping air ejectable from the shroud, a target torque generatable by the motor; and a target electrostatic current generatable by the electrostatic cascade; and a user interface disposed in electrical communication with the programmable logic controller and configured for displaying the operating rotational speed, the operating air flow rate, the operating torque, the operating electrostatic current, and an indicator signal indicative of at least one of:
    a first condition in which the operating rotational speed differs from the target rotational speed;
    a second condition in which the operating air flow rate differs from the target air flow rate;
    a third condition in which the operating torque differs from the target torque; and
    a fourth condition in which the operating electrostatic current differs from the target electrostatic current.

15. The rotary paint atomizer system of claim 14, further including:
    an air turbine coupled to the bell cup and configured for rotating the bell cup about the axis at the operating rotational speed;
    a flow meter configured for transmitting the shaping air to the shroud;
    a first proportional-integral-derivative controller disposed in electrical communication with the programmable logic controller and configured for generating the first analog command output value, the second analog command output value, and the third analog command output value;
    a first current-to-pressure transducer disposed in pneumatic communication with the air turbine and disposed in electrical communication with the first proportional-integral-derivative controller, wherein the first current-to-pressure transducer is configured for receiving the first analog command output value from the first proportional-integral-derivative controller and commanding the air turbine to rotate the bell cup about the axis at the operating rotational speed;
    a second current-to-pressure transducer disposed in pneumatic communication with the flow meter and disposed in electrical communication with the first proportional-integral-derivative controller, wherein the second current-to-pressure transducer is configured for receiving the second analog command output value from the first proportional-integral-derivative controller and commanding the flow meter to transmit the shaping air to the shroud so that the shroud ejects the shaping air at the operating air flow rate;
    a servo amplifier disposed in electrical communication with the motor and the first proportional-integral-derivative controller, wherein the servo amplifier is configured for receiving the third analog command output value from the first proportional-integral-derivative controller and commanding the motor to generate the operating torque; and
    a second proportional-integral-derivative controller disposed in electrical communication with the programmable logic controller and the electrostatic cascade and configured for generating the fourth analog command output value so that the electrostatic cascade generates the operating electrostatic current between the electrostatic cascade and the outer edge.

* * * * *